H. K., A. & C. BURKHOLDER.
Grain Winnower.
No. 91,412.
Patented June 15, 1869.
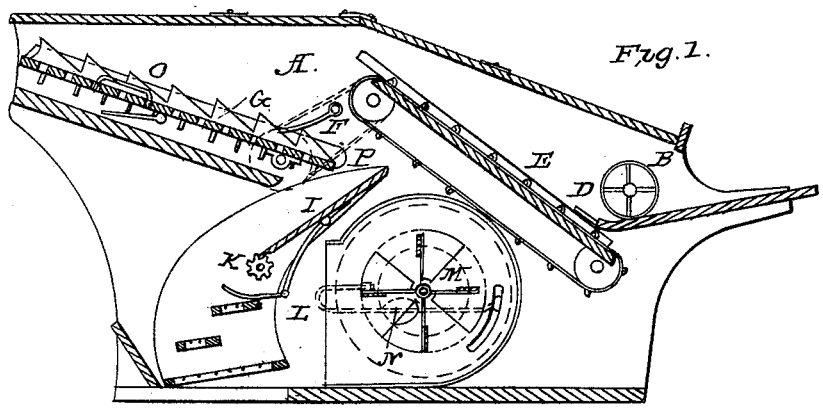
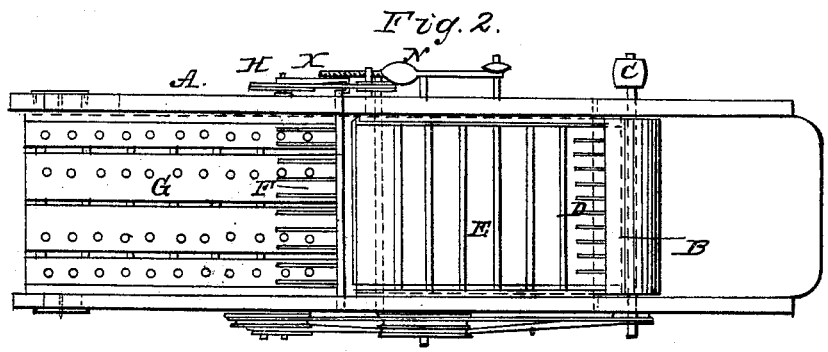
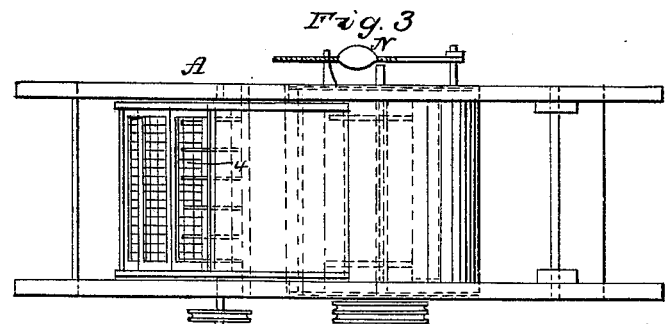

United States Patent Office.

ABRAM BURKHOLDER, CORNELIUS BURKHOLDER, AND HENRY K. BURKHOLDER, OF CLEAR SPRING, PENNSYLVANIA.

Letters Patent No. 91,412, dated June 15, 1869.

IMPROVEMENT IN GRAIN-SEPARATOR.

The Schedule referred to in these Letters Patent and making part of the same.

*To all whom it may concern:*

Be it known that we, ABRAM BURKHOLDER, CORNELIUS BURKHOLDER, and HENRY K. BURKHOLDER, of Clear Spring, in the township of Franklin, in the county of York, and in the State of Pennsylvania, have invented new and useful Improvements in Grain-Separators; and do hereby declare that the following is a full, clear, and exact description thereof, reference being had to the accompanying drawings, and to the letters of reference marked thereon.

Figure 1 represents a side view of our machine, with part of its frame removed, so as to show its internal construction.

Figure 2 is a plan view of the same, with part of the cover removed.

Figure 3 is a horizontal section view of the same.

The object of our invention is to combine certain devices in a grain-separator, in such a manner that the process of separating the grain shall be more speedily and thoroughly accomplished than by the ordinary methods.

Letter A represents the frame of our machine, which may be constructed of any shape and size desired, and is provided with two doors upon its top, so as to enable the operators to get at its machinery in case of accident.

The straw, with its grain, is passed into the frame, at the end, under the cylinder or roller B, upon the axle of which is placed the pulley C, by which motion is communicated to the rest of the machinery.

After passing under the cylinder or roller, the straw and grain pass over the rake D, upon the scraper-board E, which has a number of scoops or scrapers, attached to endless belts or chains, passing over its surface, and which convey the grain and straw forward, over the rake F, on to the shaker-board G.

This rake F extends entirely across the frame, and has one of its ends projecting outside, and shaped so as to form a crank.

Attached to the end of this crank is a small pitman, *x*, which has its other end secured to the side of the wheel H, in such a manner that the wheel, in revolving, turns this crank, and so gives this rake a backward-and-forward motion.

Upon the same shaft upon which the wheel H is placed, the shaker-board G is attached.

This shaft, inside of the frame, is shaped like a crank, so that, in revolving, not only an up-and-down motion, but also a back-and-forward one is given to the board, so as to shake the grain loose from the straw as it passes over it.

This board is loosely hinged to the back part of the frame, so as to allow it a free shaking motion, and has its top divided into a number of channels, by the means of a number of notched strips, which serve to prevent the straw from going backward.

As the grain is separated from the straw, it falls, through the holes in the shaker-board, upon the board underneath, and then, together with the chaff and straw, it is carried back upon the shoe I.

Just at the bottom of this shoe, there is placed a grooved roller, K, the axle of which is shaped like a crank at each end, and, in revolving, gives motion to this shoe.

Immediately under this roller K, there is placed a rake, L, which prevents the straw from falling upon the sieves underneath.

As the grain and chaff fall from the shoe, they are struck by a blast of air from the fan-wheel M, which drives off the chaff, allowing the grain to drop through the successive sieves, that are placed, one under the other.

This fan is placed near the centre of the frame, near the ground; and, in order that the blast which it gives may be regulated, the sides have had a number of openings made in them, which are provided with covers.

These covers are just the shape of the openings, and are connected together by rods, which extend from one to the other, as seen in dotted lines in fig. 3, which can be moved around in circular slots made for that purpose.

Upon one side, the cover is provided with two rods or projections, upon which a weight, N, is hung, which should be just sufficient to balance the covers at any desired position; or the rod which extends between these two projections can be formed like a screw, and the weight made to be moved along, so as to vary its force.

There are three sieves, more or less, as the occasion may require, used in our machine, all of which are attached to the same frame as the shoe, so that, as soon as the shoe is set in motion, these sieves are made to rock, so the grain is thoroughly sifted.

About the middle of the shaker-board, there is placed a rake, O, which raises the straw upward, and suffers the grain to be more fully separated; and at the inner end of the board there is placed a second rake, which also assists in the operation of separation.

Having thus described our invention,

What we claim, and desire to secure by Letters Patent, is—

1. The combination of the scoops or scrapers upon the board E with the four rakes L, F, P, and O, when they are used in the manner and for the purpose set forth.

2. The grooved roller K, when provided with cranks, for operating the shoe I, and regulating the feed to the blast, in the manner and for the purpose set forth.

3. The shaker-board G, when provided with three rakes, above, below, and upon one end, in combination with the rake F, pitman $x$, and shoe I, when arranged and operated in the manner and for the purpose set forth.

4. The fan M, in combination with the adjustable covers and weight N, when used in the manner and for the purpose set forth.

In testimony that we claim the foregoing, we have hereunto set our hands, this 8th day of March, 1869.

ABRAM BURKHOLDER.
CORNELIUS BURKHOLDER.
HENRY K. BURKHOLDER.

Witnesses:
  D. B. BAILEY,
  S. N. BAILEY.